United States Patent [19]

Howell et al.

[11] Patent Number: 4,466,027
[45] Date of Patent: Aug. 14, 1984

[54] DIGITAL TAPE ERASURE CONDITIONING SYSTEM

[75] Inventors: Jones V. Howell; William R. Miller, both of Costa Mesa; William A. Buchan, Newport Beach, all of Calif.

[73] Assignee: Archive Corporation, Costa Mesa, Calif.

[21] Appl. No.: 333,309

[22] Filed: Dec. 22, 1981

[51] Int. Cl.$^3$ ............................ G11B 5/47; G11B 5/55
[52] U.S. Cl. ........................................ 360/66; 360/67; 360/106
[58] Field of Search ..................... 360/66/67, 106, 105

[56] References Cited
U.S. PATENT DOCUMENTS

| | | | |
|---|---|---|---|
| 3,038,036 | 6/1962 | Young et al. | 360/66 |
| 3,156,784 | 11/1964 | Kump | 360/66 |
| 3,323,116 | 5/1967 | Solyst | 360/105 |
| 3,864,749 | 2/1975 | Stansell | 360/105 |
| 4,313,143 | 1/1982 | Zarn | 360/106 |

Primary Examiner—Vincent P. Canney
Attorney, Agent, or Firm—George F. Bethel; Patience K. Bethel

[57] ABSTRACT

The following specification sets forth a digital tape erasure conditioning circuit and system in combination with a tape drive. The tape drive is such that it drives a magnetic digital tape across an erasing and recording head within a streaming cartridge tape drive. Information is written onto the tape and subsequently read and checked in a continuous streaming manner to assure the correctness thereof. The tape is driven with respect to its various channels over write and read head portions of the head and returned in the opposite direction for writing and reading on another channel. In order to provide for multiple channels, the head is moved laterally across the face of the tape and when moved, is provided with an air cushion between the tape and the head to prevent laceration and attendant damage to the tape surface. When the tape is to be erased, an AC erasure takes place as opposed to a DC erasure wherein the media is saturated at only one level as it passes the field of the erase head. The AC erasure is provided by a rapidly alternating field as the tape moves across the head. Thus, the media is subjected to a slowly diminishing cyclic field as it moves away from the erasure gap. This causes the magnetic intensity to diminish and leave a minimal amount of magnetization, due to the AC erasure. The erasing circuitry of this invention provides a 3.58 MHz square wave to two erase drive transistors. The inductance of the erase head in parallel with stray capacitance and a resonating capacitor, allows for a resonant circuit to pump the erase head until self limiting occurs, thereby provided an AC erasure to the previously magnetized tape.

13 Claims, 11 Drawing Figures

FIG. 7
D.C. ERASE

FIG. 8
AC ERASE

FIG. 9
RECORDING WITH DC ERASED MEDIA

FIG. 10

RECORDING WITH AC ERASED MEDIA

FIG. 11

AC ERACE CIRCUIT

DIGITAL TAPE ERASURE CONDITIONING SYSTEM

BACKGROUND OF THE INVENTION

1. FIELD OF THE INVENTION

The field of this invention lies within the magnetic tape art. More importantly, it lies within the streaming magnetic tape cartridge art, wherein information is continuously imparted to a tape by writing on the tape and in some cases, reading and validating the veracity of the information being written thereon. The art can be more finitely limited to the foregoing in cooperation with a multiple channel tape and an erasure system which erases the tape to provide for more accurate information in the form of digital information written thereon.

2. THE PRIOR ART

The prior art with respect to this invention lies within the streaming cartridge tape art, wherein information can be recorded at a density of eight thousand bits per inch. The tape drive incorporates a micro-computer which controls various drive functions and interfaces with a host system.

The streaming cartridge is particularly useful by virtue of the fact that in conventional tape systems, the recorded data is blocked and can be individually assessed and updated. To preserve the individuality of each record, the tape system must start and stop between records.

The foregoing requirement necessitates the incorporation of fairly long inter-record gaps. The length of the gaps is such that a conventional tape might only use approximately twenty eight percent of the magnetic media. This of course, is a substantial detriment, inasmuch as the recordation and utilization of the tape is quite inefficient. However, to record on a tape effectively and efficiently, substantial bits of information must be provided in juxtaposition to each other, in the respective bit cells. The closer the frequency of recording in each bit cell, the greater the inaccuracies occur for various reasons.

When the inaccuracies are limited, a streaming tape format can be approximately ninety seven percent efficient, due to the fact that the tape is not started and stopped over an extended period of time.

The streaming tape system provides maximum tape utilization at a high frequency rate for those applications that do not require tape systems that access and update individual records.

The streaming system can be utilized with certain time recording techniques wherein it first passes over a write and read head along a first or zero channel or track. The second track is obtained by reversing the tape direction and reading or writing with a second channel of the head, with the head body and tape in the initial relative position. On the return, the head, or in some cases the tape itself, can be moved to provide for a passage of the third or fourth tracks or channels in the same manner as the first and second channels.

The movement of the head body relative to the tape is a necessary requirement in order to record and read various tracks or channels of the tape. This invention eliminates the concepts and methods of the prior art in moving the head and incorporates a unique method for moving the head across the tape without degradation, oxide deterioration, and in the worst case, tearing or wrinkling of the tape.

The foregoing is accomplished by maintaining an air gap, an air cushion, or an air bearing over the surface of the head as it is moved across the tape. To do this, the head is moved laterally, while the tape is moving at the beginning or toward the end of the tape when no information is written or read thereon. In the alternative, when the tape is stopped at the end of the tape, the beginning of the tape, or possibly the middle of the tape, the capstan or drive is oscillated by pulsing the motor backwardly and forwardly to provide an air cushion between the tape and the head to prevent the lateral drag of the head as it moves across the tape.

An important feature of this invention resides within the fact that oftentimes information has to be recorded and erased on the tape. This can be either with regard to erasing at discrete times, or erasing the entire tape. Regardless of the foregoing, when the tape is erased, it must be erased so that a substantial amount of digital information can be recorded on the tape thereafter without any deleterious effect on the subsequently recorded information.

In the past, a DC type of erasure was utilized wherein the media was saturated at a particular point as it passed the field of the erase head. This drove all of the media into a particular magnetic mode, so that it retained substantial remanent magnetism in one direction. In this manner, the media was magnetized in one direction as a result of the DC erasure.

This invention utilizing AC erasure, provides an erase field that is alternated rapidly relative to the movement of the media across the erase head. The portion of the media erase gap is saturated alternately between two points. As the media is moved away from the erase head, it causes a slowly diminishing cyclic field and thereby diminishes the total magnetic induction down to a substantially small degree and sometimes to a substantial zero degree of magnetism within the tape. Thus, the media is left substantially unmagnetized, as the result of the AC erasure.

By having the tape in an unmagnetized condition, it allows the prospective magnetic writing to be uniform, and avoid asymmetries. This thereby provides for symmetrical digital peaks within the media when recordation takes place.

In the prior art, because of the fact that DC erasure is more pronounced, peak shift due to asymmetry of recording occurs because of the additive nature of the DC orientation of the tape.

Stated in another way, when a DC erasure has taken place, it results in an asymmetrical remanent induction on the tape. This in turn causes a resultant output voltage from the tape wherein the negative peaks are late and the positive peaks are early. In other words, the tape has been oriented in the positive direction upon erasure, so that in order for the negative recordation to take place, the magnetism on the tape must be driven downwardly through the previously established positive erasure or bias of the DC erasure. However, because of the fact that the positive peaks when recorded are additive, they are thereby caused to be early on the tape.

The late peaks correspond to flux reversals in a so called hard direction, in other words, a direction which is difficult to drive because of the DC orientation, which would be opposite to the direction of the DC erasure. On the other hand, the early peaks correspond to flux reversals in the easily driven direction or the same direction as the DC erasure. In effect, by its additive nature, it allows for easy movement in the originally erased direction and hard movement in the opposite direction from the original erasure.

When recording with AC erased media, the same delay of both negative and positive peaks occurs from the nominal in the read head output voltage wave form. In other words, inasmuch as the writing force does not have to drive against or be additive with regard to the orientation of the magnetism of the tape, a symmetrical recordation takes place. In effect, both the negative and positive digital information on the tape is symmetrical. This is usually formed in a manner whereby the negative and positive information is provided in symmetrically spaced late peaks.

The foregoing thereby provides for substantially greater recordation accuracy and closer orientation of the peaks within the particular center of a bit cell. Thus, AC erasures virtually eliminate the peak shifts caused by asymmetry in the recording process, and allows for more accurate information to be imparted on the tape. This thereby is a substantial step over the prior art in combination with the streaming tape cartridge drive system hereof.

SUMMARY OF THE INVENTION

In summation, this invention comprises a streaming tape cartridge drive with a write-read magnetic head that moves across the tape to provide for multiple channels or tracks for writing and reading information, and erases by means of an AC erasure to provide symmetry of information on the tape and accuracy of recorded digital highs and lows.

More particularly, the invention incorporates techniques for tape drives having a cartridge, wherein the tape is driven by a capstan over a magnetic head. The magnetic head incorporates multiple write and read functions that allow the information to be entered onto the tape and read therefrom in a manner to verify the accuracy thereof. It also incorporates an erase portion of the head.

The tape drive is controlled by a micro-computer that is in turn interfaced with a host system. The drive motor is controlled by the micro-computer and a power amplifier for driving the motor connected to the capstan that is in turn controlled by a digital tachometer that feeds information back into the micro-computer.

The head with the write and read function in its housing, as well as the erasure function, is attached to a lead screw that is rotated by a stepper motor. The lateral movement of the head across the tape is provided with an air cushion between the head and the tape to prevent unwarranted wear and degradation thereof.

In addition to the foregoing, the tape erase function is particularly enhanced by utilizing an AC erasure. The AC erasure substantially eliminates any magnetic flux left on the tape after erasure. This is caused by having oscillatory erasure signals impressed on the tape that are constantly diminishing to the point where the tape is significantly erased to the point where remanent magnetism is eliminated.

After the foregoing elimination of remanent magnetism, the tape can then be oriented during the writing process to cause digital information to be recorded more accurately. This eliminates the late and early asymmetry of the peaks that is analogous to the digital information on the tape. In effect, the tape when being written on does not have to drive the magnetic orientation in one direction or have accummulative or additive magnetic forces in the other direction, which thereby cause asymmetries in the recorded information. To the contrary, the recordation on the tape can take place on a uniform and symmetrical basis. Thus, the invention is a substantial step over the prior art in providing discrete digital information that is accurate upon playback and is within specifically oriented digital cells on a highly symmetrical basis.

BRIEF DESCRIPTION OF THE DRAWINGS

The invention will be more clearly understood by reference to the description below taken in conjunction with the accompanying drawings wherein.

DESCRIPTION OF THE PREFERRED EMBODIMENTS

Looking more particularly at FIGS. 1 through 6, it can be seen that a cartridge chassis is shown having a tape drive movement driven by a drive motor 12 connected to a drive roller 14. The drive roller 14 provides movement to a belt, capstan or roller, generally described hereinafter as a capstan 16.

Figure 1:
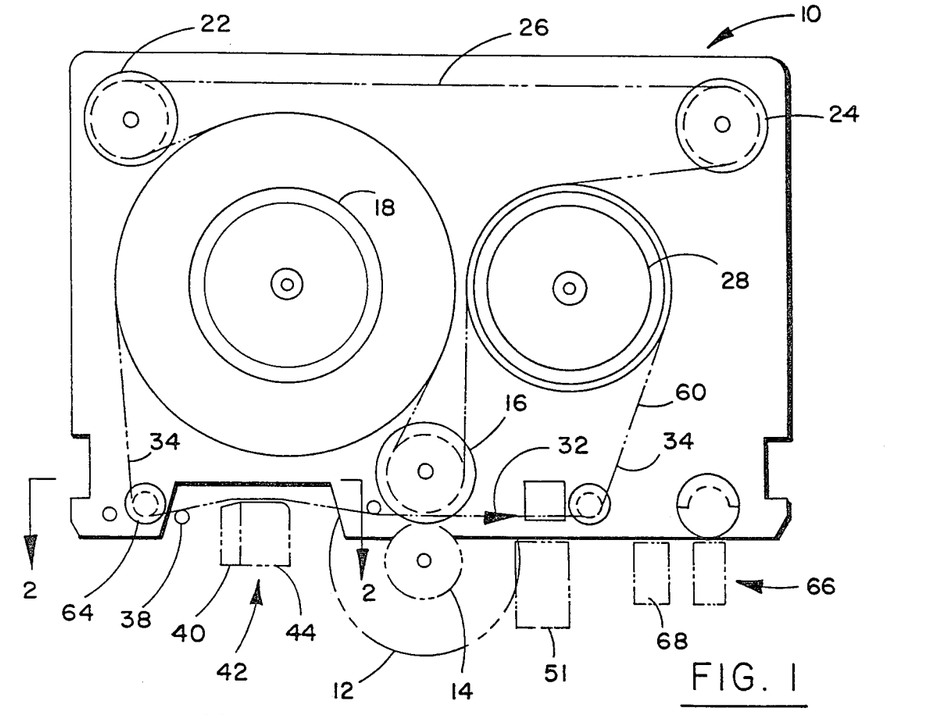
FIG. 1 shows a plan view of the streaming cartridge tape drive of this invention as to the mechanical elements thereof.

A tape is provided from a supply spool 18 and guided by a pair of belt drive rollers 22 and 24 that provide drag for a drive belt 26. A takeup hub 28 in conjunction therewith receives a tape around its surface as it is coiled thereabout.

The tape movement of FIG. 1 is shown in the direction of arrow 32 wherein a tape 34 is shown moving in the direction of the arrow for takeup on the takeup hub 28.

The tape 34 moves across an integral tape cleaner 38 and then over an elongated erase bar 40 of a magnetic head assembly 42. The magnetic head 42 has a read-write head portion 44 providing a write portion 46, a read portion 48, an upper write portion 50 and a read portion 52. Elements 46 through 52 can be seen in FIG. 6.

Figure 4:
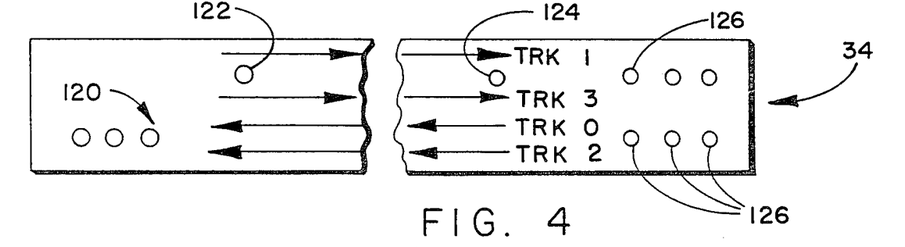
FIG. 4 shows a diagramatic view of the tracks on the tape.

In order to detect tape movement, a number of holes are provided, such as those shown in FIG. 4, which are sensed by a tape hole sensor or port 51. The outside exposed portion of the tape is shown as side 60 of tape 34 after it has passed over two fixed tape guides 62 and 64.

A space switch 66 and a file protect function is provided for detecting when a cartridge is implaced by a cartridge inplace switch 68.

Figure 2:
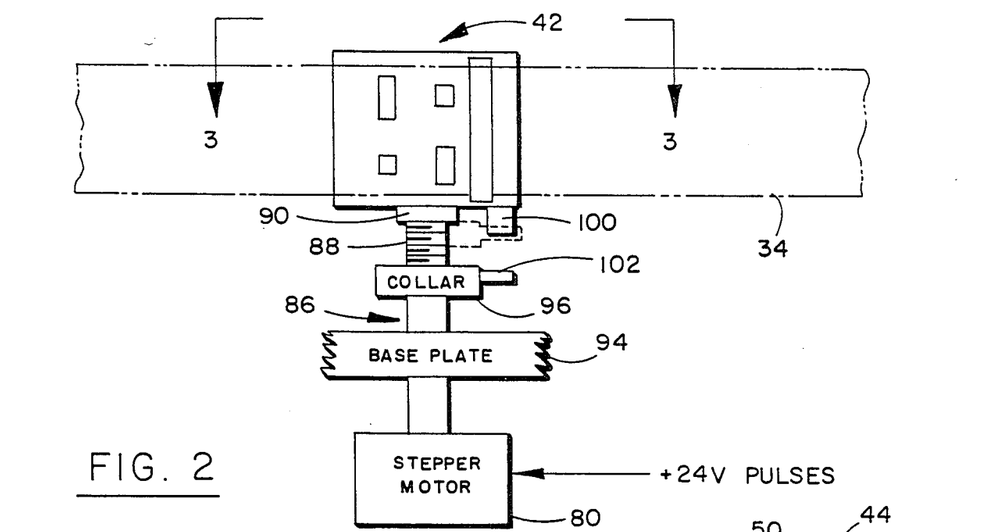
FIG. 2 shows a view looking at the magnetic head, with the tape moving thereover and the support and drive system for the head in the direction of lines 2—2 of FIG. 1.

When write and read functions are provided by respective write and read magnetic portions 46 and 48, they provide for the zero track moving in the direction of arrow 32; magnetic portions 50 and 52 provide for the first track moving opposite from the direction of arrow 32. When the head is moved laterally across the face of the tape or downwardly, as shown in FIG. 2, the respective write and read functions of elements 46 and 48 write and read on track 2; upon return of the tape 34, elements 50 and 52 write and read on track 3.

Figure 6:
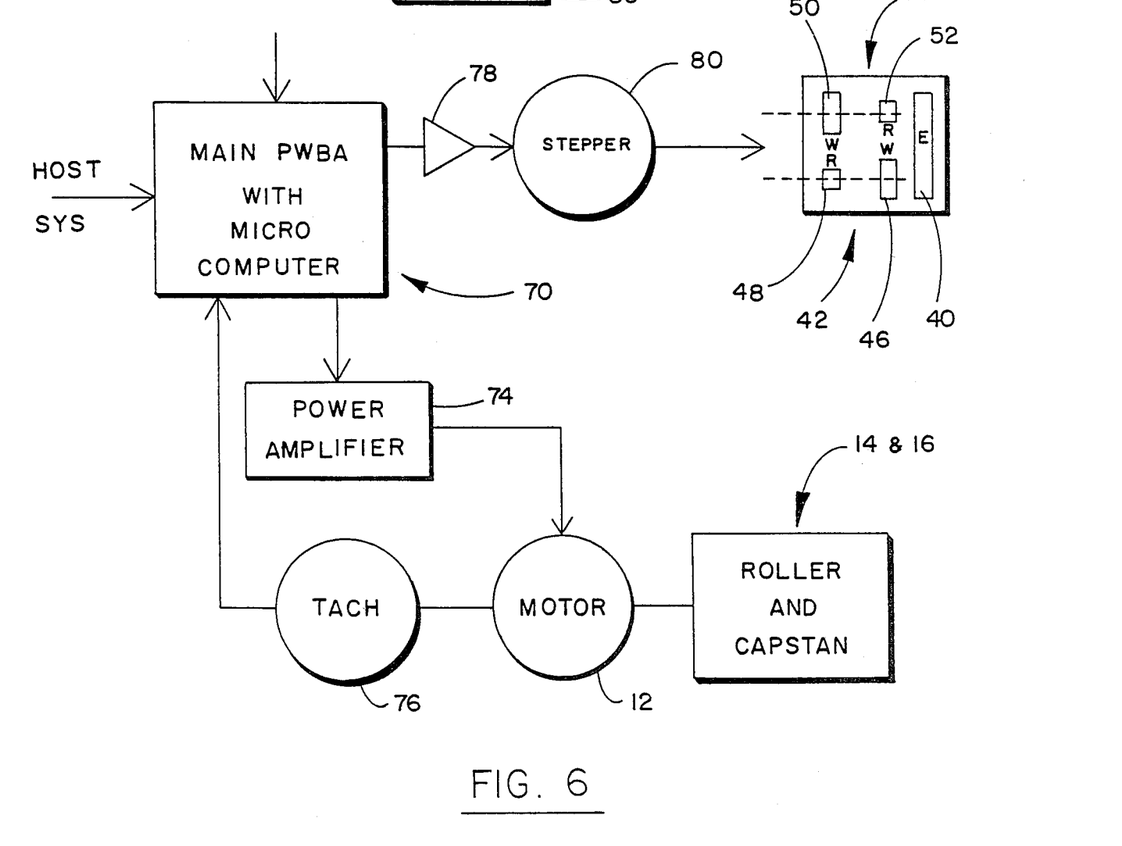
FIG. 6 shows a schematic view of the control elements of the cartridge drive in block form.

A micro-computer 70 interfaces with the host to create an intelligent drive. The system offers a read after write error sequence to determine any errors, and is performed sequentially on the tape. The amplifier 74 from the micro-computer 70, puts out a signal to the allow the motor 12 driving the roller 14 and capstan 16 to function in a proper manner. Fundamentally, the output of the micro-computer is interfaced to a power amplifier 74 that provides the power to the motor 12.

The amplifier 74 is of a Darlington configuration and is controlled by the micro-computer in response to a digital tachometer 76 that monitors the speed of the motor 12 and puts out a square wave signal to the micro-computer 70.

When the tape is streaming along one of its four respective tracks zero through three, the head is not moved. However, toward the end of the tape at one end or the other, the head must be moved, to allow for sequencing of the tracks.

The moving elements connected between the head 42 and the stepper motor 80 as driven by the amplifier 78 are shown mechanically in FIG. 2. The movement of the stepper motor 80 is provided by voltage pulses such as twenty-four volts which turn a screw 86 having threads 88 threaded through a matching female nut member 90 that supports the head 42. As the screw 86 turns, it raises and lowers the head during movement laterally across the face of the tape to move the respective write and read head portions 46 and 48 and 50 and 52 to provide for sequential channel recording on tape 34.

The screw 86 passes through a base plate 94 and allows a collar 96 to rotate therewith which is affixed thereto by means of an Allenhead screw.

As the screw 86 rotates, it turns the collar until it engages a stop 100. The stop 100 stops an appendage 102 of the collar which allows for a bottom or end of screw movement placement. This allows for the stepper motor to turn in relationship to a fixed position every time in order to move the head 42 upwardly or downwardly.

In order to cushion the movement of the head 42 across the face of the tape 44, an air cushion is provided when the head is to be moved. Head movement is of course required at the beginning and the end of the tape which is sensed by warning holes 120. Warning holes 122 and 124 permit a reading by port 51 to determine when the end of the tape is to arrive. When returning in the other direction, the backward mode is determined at points 126 pertaining to tracks 1 and 3.

Figure 3:
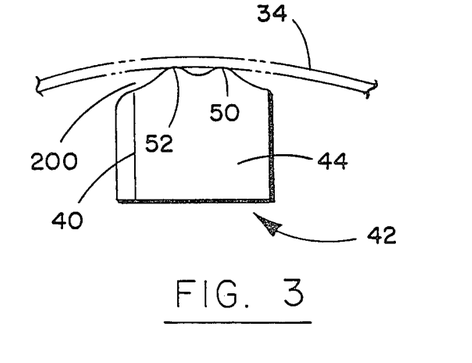
FIG. 3 shows a view looking downwardly at the tape passing over the head in the direction of lines 3—3 of FIG. 2.

In order to effectively move the head 42 as shown in FIG. 3 across the face of the tape 34, a gap or air cushion 200 is provided to prevent oxide deterioration and provide for longevity of the tape.

Figure 5:
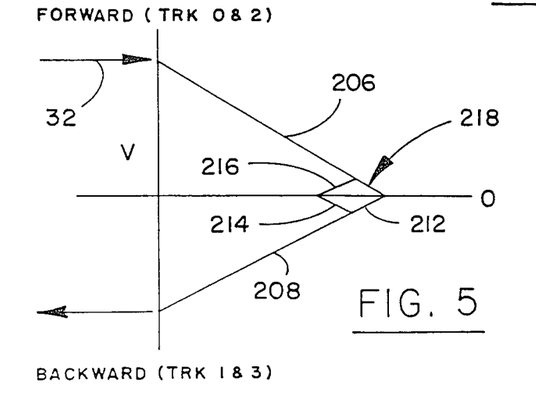
FIG. 5 shows a graph of tape movement with respect to velocity.

The first method of moving the head 42 across the tape, is to move the head during deceleration, such as that shown along line 206 of the graph of FIG. 5. The other means is to move the head during the acceleration mode along line 208. These two respective modes are at the end of the tape or at the beginning of the tape, depending upon how the tape is running.

In addition to the foregoing mode, the applicant has determined that a pulsing of the motor 12 by the micro-computer 70 through amplifier 74 provides an oscillatory movement in the direction of line 212 of FIG. 5. Thus, pulsing in the direction of line 212 provides acceleration from zero to a given velocity and then deceleration along line 214 to a zero velocity. A forward pulse along line 216 provides a positive velocity which is allowed to decelerate along line 218.

The foregoing pulses allow for an air cushion while at the same time the micro-computer 70 provides an output through the amplifier 78 to a stepper motor 80 to drive the screw 86 in the direction desired to move the head 42. The pulsing and the attendant air cushion eliminate the movement of the head in a lateral manner that would create drag and attendant degradation or tearing of the tape. Thus, on balance, the tape movement of this invention with the head movement of this invention provides for significant advantages over the prior art by creating a cushion during the movement thereof.

Figure 7:
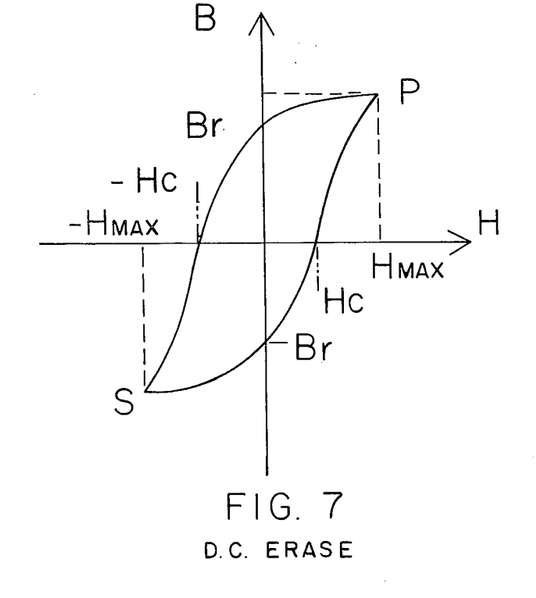
FIG. 7 shows a hysterisis loop of the magnetic digital tape when DC erase is utilized.
Figure 8:
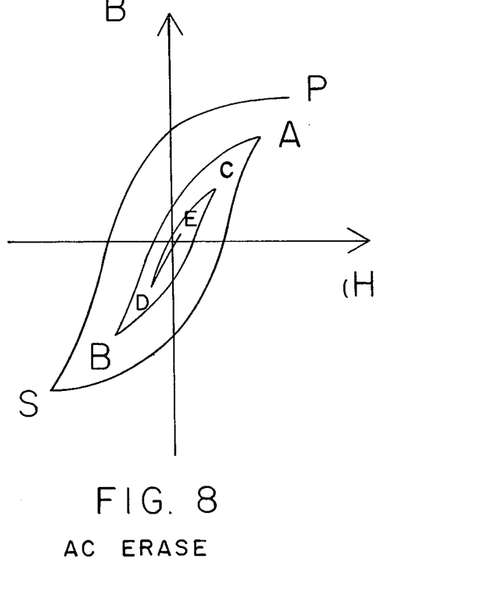
FIG. 8 shows the hysterisis loop on a diminishing basis when AC erase is utilized.

Looking more particularly at FIGS. 7 through 11, it can be seen that there is a substantial portion of this invention which pertains to an AC erasure system for the foregoing tape drive. In particular, FIGS. 7 and 8 show the respective hysterisis loop for DC erasure and AC erasure.

The foregoing erase functions can be provided through the head 42 and in particular, the erase portion of the erase bar 40. The erase bar 40 is such that it is provided with an AC signal to be described in the circuit shown in FIG. 11 for purposes of erasing the tape. The head effectively can be looked upon inductively as to its electronic character in the manner to be described with respect to FIG. 11. The AC erase function and system of this invention is a substantial feature hereof and will be exemplified in greater detail as to the merits thereof when considering DC erasure of the prior art with regard to streaming tape cartridges.

Looking at the comparative showings of FIGS. 7 and 8 with regard to the hysterisis loop for DC erase and AC erase, it can be seen that a certain flux density B is shown. The flux density B is shown graphed as it increases upwardly, so that it is plotted with regard to the magnetic force H and $-H$. The residual or more properly, remanent flux density $B_r$ is shown in its positive and negative directions. The respective coercivity of the media or magnetizing force required to magnetize the media in the form of coercivity $H_c$ is shown in the positive and negative directions.

During the process of DC erasure, when a given voltage or current is applied, the media is saturated to point P as it passes the field of the erase head 40. It retains remanent magnetism $B_r$ as the media moves away from the influence of the erase head 40. The media is thus left with a strongly magnetized orientation in one direction. This is shown dramatically in the showing of FIG. 7 wherein the hysterisis loop of DC erasure is shown therein.

During AC erasure, the erase field in the head 40 is alternated rapidly relative to the movement of the media across the erasure head. The portion of the media at the erase gap is saturated alternately between P and S as shown in FIG. 8. By virtue of the fact that the tape is moving, it is subjected to a slowly diminishing cyclic field as it moves away from the erase gap. Thus, the magnetic intensity B will follow the path PSABCDE, as shown in FIG. 8. In effect, the magnetic induction has undergone a series of successively smaller hysterisis loops until it reaches zero or approximately zero, depending upon the speed of the tape. The media is thus left unmagnetized or substantially unmagnetized as a result of the AC erasure.

The foregoing examples of erasure, between AC and DC erase, show that the tape is fundamentally left unmagnetized in an AC erasure, whereas it has a particular magnetic bias with regard to DC erasure. This magnetic bias is always in one direction or the other. For purposes of convention, it is shown in the positive direction up to point P in the showings of FIGS. 7 and 8.

Figure 9:
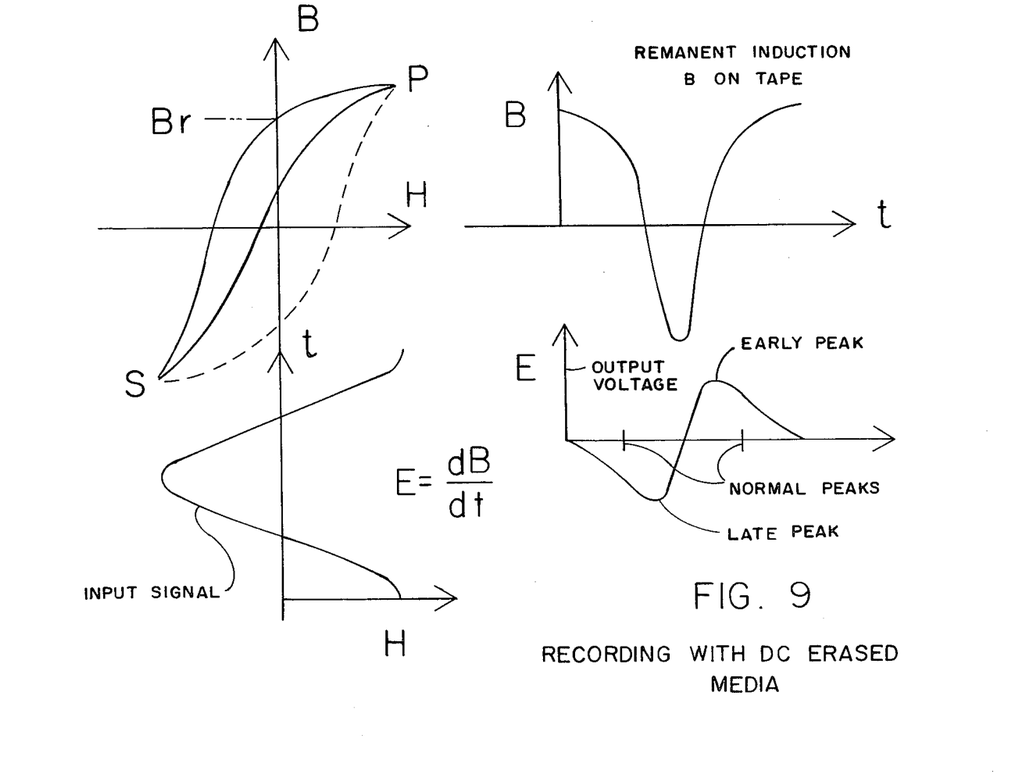
FIG. 9 shows the effect of recording when DC erased media is provided for recording purposes.
Figure 10:
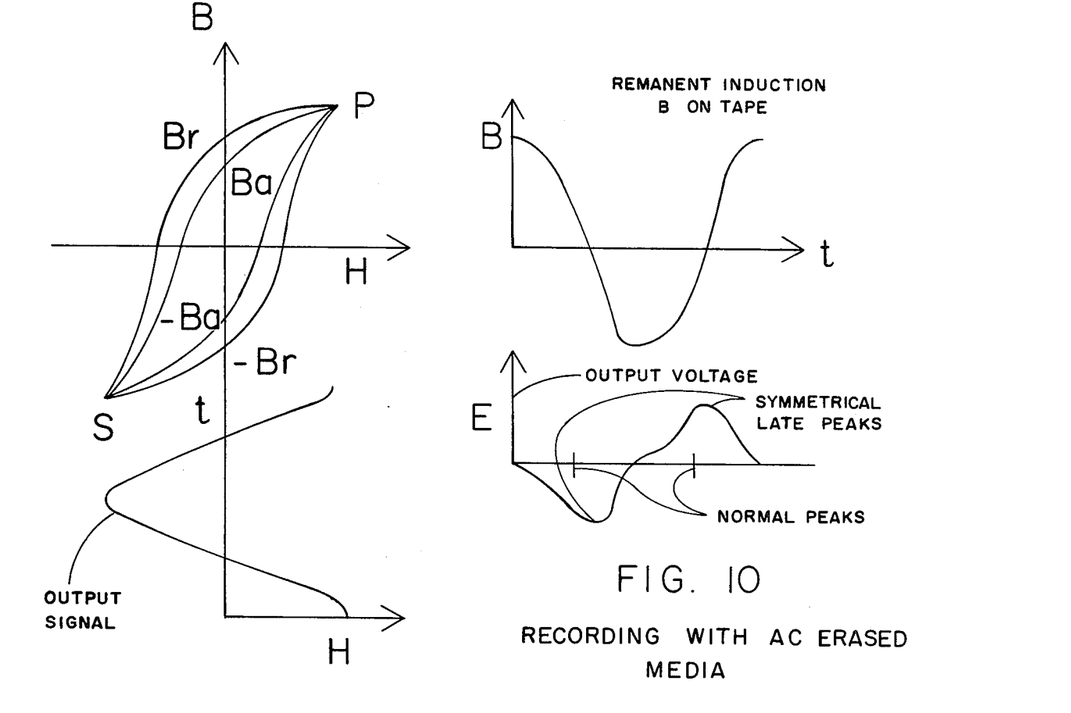
FIG. 10 shows the effect of recording with AC erased media.

For purposes of comparison, FIGS. 9 and 10 show the respective effect of recording on the DC and AC erased media.

Looking more particularly at FIG. 9, it can be seen that the tape has been magnetized to $B_r$.

The media entering the influence of the write head which has been subject to DC erase, has been magnetized to $B_r$. Thus a flux reversal from P to S very nearly follows the $PB_rS$ portion of the hysterisis loop of FIG. 7. However, a flux reversal from S to P cannot follow the $SB_rP$ portion of the hysterisis loop of FIG. 7. This is due to the fact that it is biased upwardly due to the magnetized media entering the vicinity of the head 42.

The effective hysterisis loop for recording with DC erased media is shown in FIG. 9. In this case, the symmetric input signal H proportional to the magnetizing current, results in asymmetrical remanent induction $B_r$ of the tape. This in turn yields an output voltage E which is proportional to the rate of change of B with respect to time. In this case, it can be seen that time is shown as t in FIG. 9.

The foregoing yields an output voltage that has negative peaks that are late and positive peaks that are early with respect to the nominal peaks.

The late peaks of the voltage E correspond to flux reversals in the so called hard direction or the direction opposite to the direction of DC erasure. In effect, it is more difficult to orient the magnetic properties of the tape in the direction opposite to where the erasure ended up due to the respective remanent flux density $B_r$. This is due to the fact that remanent flux density must be driven and at the same time an input must be applied that results in a particular voltage opposite from the remanent magnetic direction. The orientation in effect is referred to as the hard direction because of the driving force required. To the contrary, the easy direction is in the same direction in which the DC erasure took place.

The direction of orientation of DC erasure, in other words is in the easy direction or as the residual flux density. This creates early peaks corresponding to such flux reversals in the easy direction, due to the fact that the reversal is additive, and more quickly accomplished with respect to time.

The remanent induction on the tape shown in FIG. 9 for DC erasure, results in additive or residual magnetism which remains on the tape after the magnetizing signal is removed. Insamuch as the late peaks shown with respect to time and output voltage and the early peaks are asymmetrical, there is a degree of peak shift which results in flux transition crowding.

It should be noted that asymmetry in peaks due to DC erasure is more pronounced for lower recording frequencies, such as in the range of 225 KHz and 150 KHz. The frequencies above 450 KHz recording frequencies provide greater symmetry as to the respective peaks.

The recording results can be seen by the remanent induction B on the tape with respect to time, being in a substantially narrow range. Thus, the respective early and late peaks are asymmetrically crowded into bit cells and are asymmetrical with regard to those nominal peaks shown with respect to the head output voltage E. As previously stated, the output voltage E is a function of the change of flux density B with respect to time. This being the case, the hard driven direction provides for late peaks and the easily driven direction provides for early peaks as far as the highs and lows go of the digital information recorded on the tape.

When recording with AC erased media, the write head or those shown as head 46 and 50, do not have to influence a substantially magnetized media. In this manner, a flux reversal from P to S as shown in FIG. 10, is biased downwardly from P, $B_r$, S, to the P, $B_a$, S part of the hysterisis loop. This causes a flux reversal from S to P biased upwardly by the same degree as the flux reversal from S to $B_r$, P to the S $B_a$, P portion of the hysterisis loop as indicated in FIG. 10. In effect, there is no remanent magnetism because the influence of the AC erasure as seen in FIGS. 8 and 10 has diminished this substantially down to a minimal amount or zero.

Inasmuch as the hysterisis loop P, $B_r$ to S to $-B_r$ to P is symmetrical, there are symmetrical distortions. In effect, non-linearity of the loop causes symmetrical distortions and remanent induction, which in turn causes the same delay for both negative and positive peaks from the nominal in the read head output voltage wave form.

Stated another way, inasmuch as the function with regard to time of the magnetic driving force is the same, the respective peaks, whether they be negative or positive, lag in the same manner. This is caused by the fact when driving negatively or positively, the magnetic force does not have to go against a hard or with an easy direction. To the contrary, it does not have to drive or is it additive in any particular direction. This, in effect, causes a respective drive of the tape due to its magnetic properties only with respect to time.

In effect, with AC erase, as frequencies decrease such as in the 150 KHz range, the asymmetry peak shift increases and is 70 nsec. When substantial frequencies such as 450 KHz are encountered, the lag time with regard to the peak shift as to both positive and negative directions, is approximately shifted late by 10 nsec.

The foregoing is typical for a 90 inch per second drive using AC erase wherein the bit cell for a 90 inch per second drive amounts to 1,111 nsec.

The resulting recordation provides for greater accuracy and smaller inaccuracies by the remanent induction B on the tape being wider after recording. Also, it provides output voltages on a symmetrical basis after an AC erasure and subsequent recording has taken place.

Figure 11:
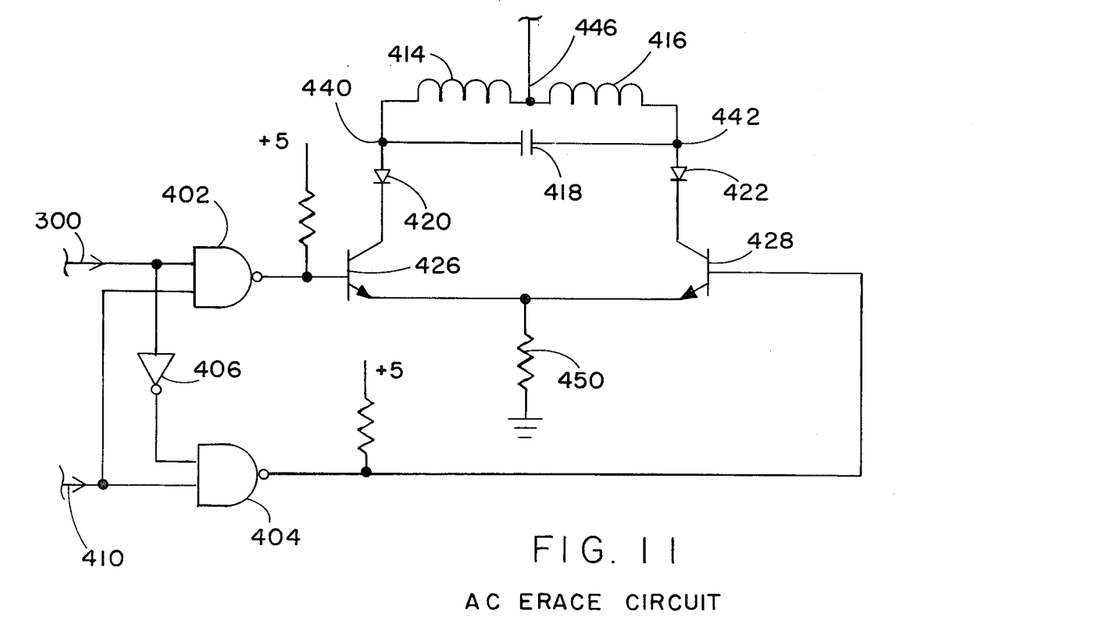
FIG. 11 shows a diagram of the circuitry that can be used to provide the AC erasure of this invention.

To effect the foregoing AC erasure through the erase head 40, the circuitry of FIG. 11 is shown.

In order to cause the circuit to function for purposes of erasing the tape by means of erase head portion 40 of the head 42, a complementary 3.58 MHz square wave is introduced on line 300. The square wave is approximately eight times the recording frequency of 450 KHz, of a ninety inch per second drive, or twenty-four times the recording frequency for 150 KHz with respect to a thirty inch per second drive.

The signal or square wave form on line 300 is applied to the bases of two erase drive transistors 402 and 404. The erase drive transistors are driven alternately due to the fact that an inverter 406 is connected to transistor 404.

The foregoing transistors are turned on by means of an erase enable signal provided on line 410. The erase enable signal allows the transistors 402 and 404 to function with regard to the signal with a 3.58 MHz square wave form on line 300.

The inductance of the erase head 40 that is shown as components 414 and 416 are in parallel with stray capacitance and a capacitance provided by capacitor 418, to form a high Q resonant tank circuit at 3.58 MHz. In effect, capacitor 418 is a resonating capacitor in conjunction with the inductance of the erase head 40.

The erase driver transistors 402 and 404 alternately pump the resonant circuit until self limiting occurs. A pair of decoupling diodes 420 and 422 protect the transistors 402 and 404 from erasure head voltage swings below zero volts. Additionally, a pair of driver transistors 426 and 428 are utilized to provide the driving signal to the respective erasure head portions 414 and 416.

The foregoing circuit provides for peak to peak voltage swings of 70 volts on either side of the erase head. The erase head is constructed of a ferrite material to achieve the low losses required to operate at 3.58 MHz. A non-bifilar winding is used to reduce the stray capacitance to a minimum and an inductance match tolerance of less than five percent is achieved to insure total demagnetization of the recording media.

The head 42 in effect incorporates erase head portions 414 and 416 along erase bar 40. The erase head portions of the erase head 40 are provided by a pair of terminals 440 and 442 that are center tapped at 446.

To provide for current limiting, a current limiting resistor 450 is shown in conjunction with the entire circuit. Thus, the circuit operates in a push-pull mode to provide for the AC signal driving and the oscillation necessary to erase on an AC basis through the head 40. This provides the desirable effects of AC erase for a streaming cartridge tape drive system.

In summation, the invention is a substantial step over the prior art by providing for the enhanced recordation of information in digital cells that are far more accurate than prior art erasures for streaming cartridge tape drives and information in digital tape cells in general. As a consequence, this invention in its combined form, should be read as a substantial step over the prior art and accorded the complete breadth and scope of the following claims hereinafter.

We claim:

1. A digital tape cartridge drive having a read-write magnetic head with erasure capability comprising:
    means for supporting the magnetic head;
    means for moving said magnetic head across said tape in a lateral manner; and,
    a circuit connected to said erase head for providing a square wave form exceeding the recording frequency, and having at least two transistors forming a push-pull drive to said magnetic erase head for providing an AC signal to the erase head for causing said erasure portion of said head to erase the tape in a substantially alternating current wave pattern to substantially diminish the remanent hysterisis on the tape thereafter wherein said hysterisis on said tape, after the alternating current erasure, is diminished to the point where subsequent writing on said tape does not require substantial driving effort against any magnetic hysterisis, and the remanent magnetic flux is diminished on a graduated basis with respect to time.

2. The tape drive as claimed in claim 1 wherein:
    said driving circuit comprises a pair of transistors with an inverter therebetween for providing an oscillating AC signal.

3. The tape drive as claimed in claim 2 further comprising:
    driving transistors connected respectively to the outputs of each of said first transistors.

4. The drive as claimed in claim 3 further comprising:
    means for creating a resonant frequency in connected relationship with the output of said second driving transistors.

5. The drive as claimed in claim 4 wherein:
    said resonating means comprise an inductive element within the erase head and at least one capacitor across said erase head.

6. The drive as claimed in claim 5 further comprising:
    decoupling means in the form of diodes between the outputs of said respective drive transistors; and further comprising:
    a center tap between said inductive element of said magnetic erase head.

7. The process for erasing digital signals on a magnetic tape that is driven by a tape cartridge drive having read-write capabilities for writing and reading information on the tape wherein the process comprises:
    passing said tape by an erase head;
    providing said erase head with an alternating current (AC) signal so as to substantially diminish the remanent hysterisis within said tape as a function of time; and,
    driving said head by means of transistors in a push-pull relationship provided by an inverter between said transistors.

8. The process as claimed in claim 7 further comprising:
    passing said tape in a manner over said erase head so as to allow said AC signal to cause a constantly diminishing hysterisis within said tape as it passes to the point of substantially no hysterisis within said tape so as to maintain a magnetically neutral character for later provision of signals thereon.

9. The process as claimed in claim 8 further comprising:
    driving said erase head by the signal emanating from said first transistors on a push-pull basis with increased drive through a second set of transistors.

10. The process as claimed in claim 9 further comprising:
    decoupling said erase head by decoupling diodes interposed between the output of said two respective driving transistors and said head while at the same time resonating said head in conjunction with the stray capacitance thereof in cooperation with at least one resonating capacitance means.

11. The process as claimed in claim 7 further comprising:
writing on said tape after it has been erased in a manner whereby the writing signal applied to the tape is substantially neither added to nor diminished due to remanent magnetism on the tape.

12. The process as claimed in claim 11 further comprising:
writing on said tape so as to provide digital input peaks that are fundamentally symmetrical whether they be positive or negative peaks.

13. The process as claimed in claim 12 further comprising:
changing channels of said tape by moving said read-write head across said tape with an air cushion between the tape and the magnetic head.

* * * * *